(12) United States Patent
Lovell et al.

(10) Patent No.: US 6,991,218 B2
(45) Date of Patent: Jan. 31, 2006

(54) CONTROL VALVE WITH RETAINED PIN FOR EASY VALVE TRIM MAINTENANCE

(75) Inventors: Michel K. Lovell, Marshalltown, IA (US); Alan D. Bremers, Sherman, TX (US); Michael M. Anderson, Marshalltown, IA (US); Mark D. Stiehl, Marshalltown, IA (US)

(73) Assignee: Fisher Controls International LLc., St. Louis, MO (US)

( * ) Notice: Subject to any disclaimer, the term of this patent is extended or adjusted under 35 U.S.C. 154(b) by 42 days.

(21) Appl. No.: 10/643,523

(22) Filed: Aug. 19, 2003

(65) Prior Publication Data

US 2004/0104374 A1 Jun. 3, 2004

Related U.S. Application Data

(60) Provisional application No. 60/410,496, filed on Sep. 13, 2002.

(51) Int. Cl.
*F61K 1/48* (2006.01)

(52) U.S. Cl. .............................. 251/357; 251/77; 251/86
(58) Field of Classification Search ................... 251/77, 251/78, 84, 86, 356, 357
See application file for complete search history.

(56) References Cited

U.S. PATENT DOCUMENTS 3,552,421 A * 1/1971 Yocum ........................ 137/321
3,771,765 A * 11/1973 Scapes ........................ 251/310
3,934,814 A 1/1976 Orszak ......................... 251/80
4,721,284 A * 1/1988 Bankard ....................... 251/86

FOREIGN PATENT DOCUMENTS

| DE | 416889 | 8/1925 |
|----|--------|--------|
| EP | 1 150 051 A3 | 10/2001 |
| EP | 1 150 051 A2 | 10/2001 |
| GB | 1 536 362 | 12/1978 |

OTHER PUBLICATIONS

International Preliminary Examination Report in PCT/US03/27493 dated Sep. 8, 2004.

International Search Report in PCT/US03/27493 dated Aug. 1, 2004.

Fisher Type 357 Reverse Valve.

* cited by examiner

*Primary Examiner*—J. Casimer Jacyna
(74) *Attorney, Agent, or Firm*—Marshall, Gerstein & Borun LLP

(57) ABSTRACT

A process control valve includes a valve stem, a valve plug. The valve stem and the valve plug are attached to one another by an arrangement that includes a locking pin that passes through substantially aligned bores in the valve stem and the valve plug. The locking pin is positively retained mechanically and prevented from extending outside of the bores in the valve stem and the valve plug.

9 Claims, 2 Drawing Sheets

CONTROL VALVE WITH RETAINED PIN FOR EASY VALVE TRIM MAINTENANCE

RELATED APPLICATION

This application claims the benefit of U.S. Provisional Application Ser. No. 60/410,496, filed Sep. 13, 2002.

FIELD OF THE INVENTION

This invention relates generally to valves and more particularly to on/off valves, throttling valves and control valves.

DESCRIPTION OF THE RELATED ART

Throttling valves, on/off valves and control valves are used in a wide number of process control system applications to control some parameter of a process fluid. While the process control system uses such a valve to ultimately control the pressure, level, pH or other desired parameter of a fluid, the valve basically controls the rate of fluid flow.

Typically, an on/off valve, throttling valve, or control valve includes a fluid inlet passage coupled through an orifice to a fluid outlet passage and a closure member disposed in the orifice, which controls the amount of fluid flow therethrough. The closure member may include a valve plug having a surface which seats against a seat ring disposed at the orifice. During operation, the control system moves the valve plug towards and away from a surface of the seat ring to provide a desired fluid flow through the orifice and, therefore, the valve.

It is desirable to positively retain valve trim components within a valve body of a control valve to minimize the chance of loose pieces traveling downstream and causing damage to other process equipment such as, for example, compressors, pumps, or turboexpanders. For example, in some control valves, the valve plug may be threadably secured to a valve stem, and prevented from rotating with respect to the valve stem by a locking pin that may be disposed within a bore passing through both the valve plug and the valve stem. The locking pin may be press fit into the bore, or alternatively, a bolt may be used in place of the locking pin that may be threadably received within the bore passing through the valve plug and the valve stem.

In order to prevent the locking pin or locking bolt from exiting the bore, by selecting the appropriate pin material, stem material, and hole size, a tightly fitting pin, such as a groove pin, may be used, to reliably stay in place without positive mechanical restraint. However, the locking pin must be drilled out for removal during valve maintenance. In addition, some valves are configured such that a cage trim, disposed between the valve seat and the valve bonnet, serves to prevent the locking pin or locking bolt from exiting the bore during valve operation. However, if the valve is disassembled by separating the valve bonnet from the valve body, the locking pin or locking bolt may be accessed and removed if desired.

In addition, for some applications, it may not be desirable to utilize a valve cage. For example, if the fluid being controlled is likely to clog the valve cage (such as, for example, a gritty or sticky process fluid), a different configuration for retaining the locking pin or locking bolt without the use of a cage trim, may be desirable.

SUMMARY OF THE DISCLOSURE

A valve trim assembly is provided for a process control valve having a valve body and a bonnet. The valve trim assembly includes a valve plug adapted to move to one of a plurality of operational positions with respect to the valve body. The valve plug includes a plug bore, and a movable valve stem is attached to the valve plug. The movable valve stem includes a stem bore therein that is adapted to substantially align with the plug bore. A locking member is disposed in the stem bore and the plug bore and a retaining member may be attached to the bonnet. The retaining member substantially surrounds the locking member at all operational positions of the valve plug.

BRIEF DESCRIPTION OF THE DRAWINGS

The advantages of the present invention will be apparent upon reading the following description in conjunction with the drawings, in which.

DETAILED DESCRIPTION

Figure 1:
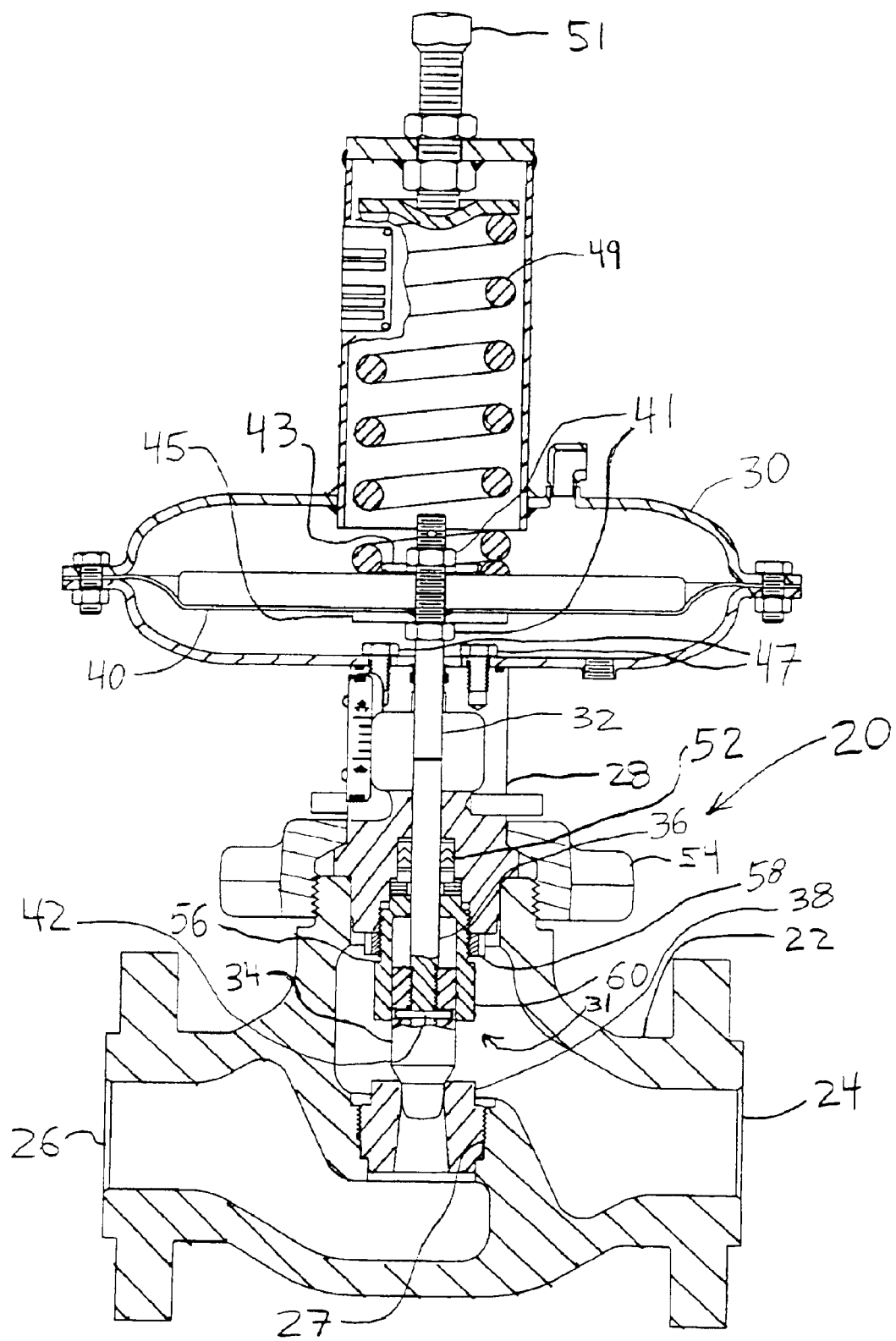
FIG. 1 is a cross-sectional view of a control valve including a mechanically retained locking pin in accordance with the teachings of the present invention.

With reference initially to FIG. 1, a process control valve 20 includes a valve body 22 that includes an outlet passage 24, an inlet passage 26, an orifice 27 disposed between the outlet passage 24 and the inlet passage 26, and a bonnet 28. (In an alternate example, the inlet passage 26 and the outlet passage 24 may be reversed, such that the fluid inlet passage becomes the fluid outlet passage, and the fluid outlet passage becomes the fluid inlet passage, thereby changing an upward flow valve to a downward flow valve.) An actuator housing 30 is attached to the bonnet 28.

A valve trim assembly, generally indicated at 31, includes a valve stem 32 and a valve plug 34 that may be secured to a lower end 36 of the valve stem 32, as oriented in FIG. 1. The valve stem 32 may extend through the actuator housing 30, the bonnet 28, and partially into the valve body 22.

The valve plug 34 may be sized and shaped to sealingly engage a valve seat ring 38 disposed within the orifice 27 in the valve body 22 when the process control valve 20 is in a closed configuration. The valve stem 32 may be moved vertically in a known manner with respect to the bonnet 28, the actuator housing 30, and the valve body 22. For example, a diaphragm 40 within the actuator housing 30 may be used to facilitate vertical movement of the valve stem 32. The diaphragm 40 may be secured to the valve stem 32 using nuts 41 and upper and lower diaphragm washers 43 and 45, respectively. The actuator housing may be secured to the bonnet 28 using cap screws 47.

Figure 2:
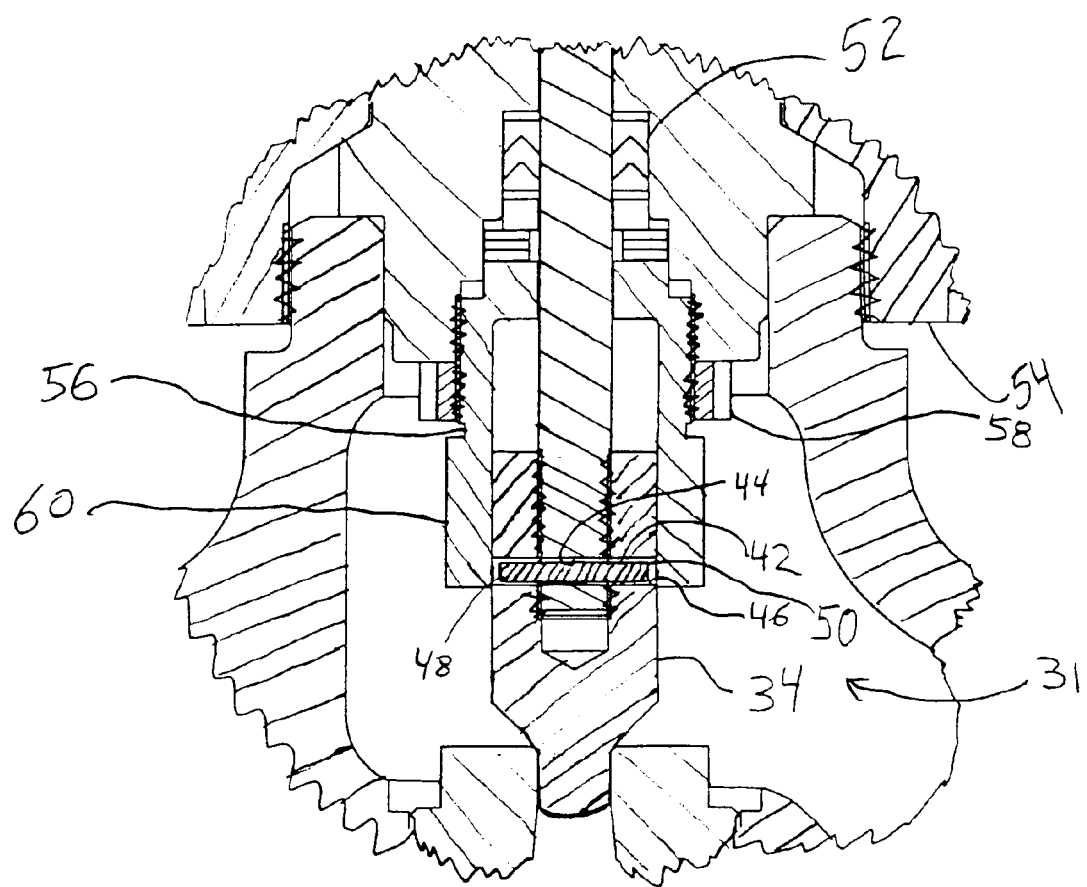
FIG. 2 is an enlarged detail view of a portion of the control valve of FIG. 1.

The valve plug 34 may be threadably connected to the lower end 36 of the valve stem 32, as best seen in FIG. 2. A locking member such as a locking pin 42 may be disposed in a stem bore 44 in the valve stem 32 that is aligned with a corresponding plug bore 46 in the valve plug 34. The locking pin 42 may be sized such that a first end 48 and a second end 50 of the locking pin 42 are both disposed within the plug bore 46.

As is generally understood in the art, movement of the diaphragm 40 causes movement of the valve plug 34 to one of a plurality of operational positions with respect to the valve body 22. Accordingly, by controlling the pressure present in the upper and/or lower chambers of the actuator housing 30, the position of the valve plug 34 may be controlled. As shown in FIG. 1, the process control valve 20 may include a preload spring 49 and an adjusting screw 51 for adjusting the amount of force provided by the preload spring 49. It will be appreciated that other types of actuators in addition to the diaphragm actuator illustrated in FIG. 1 may be used without departing from the present invention.

In order to provide proper sealing, packing 52 may be provided between the valve stem 32 and the bonnet 28. The bonnet 28 may be secured to the valve body 22 by a hammer nut 54 threadably secured to the valve body 22. The packing 52 may be secured in place by a packing retainer 56 that may be threadably attached to the bonnet 28 and that may be further secured in place by a lock nut 58. The lock nut 58 may be configured as described in commonly assigned and co-pending U.S. Provisional Patent Application Ser. No. 60/410,620 entitled, "Retainer Lock Nut for Fluid Pressure Control Device".

The packing retainer 56 includes a lower portion 60 that extends downwardly, as oriented in FIGS. 1 and 2. The lower portion 60 may be cylindrically-shaped, and serves as a retaining member that surrounds the locking pin 42 during operation of the process control valve 20. Specifically, while the valve is in operation, both the first end 48 and the second 50 of the locking pin 42 are prevented from extending beyond the surface of the valve plug 34 by the presence of the lower portion 60 of the packing retainer 56. The location of the locking pin 42 may be selected such that the valve seat ring 38 does not allow the valve plug 34 to travel downward sufficiently to expose the locking pin 42 below the lower portion 60 of the packing retainer 56. Thus, over its entire range of travel, between a first or upper travel limit, and a second or lower travel limit, the valve plug 34 will always remain in a position such that the first end 48 and the second end 50 of the locking pin 42 will be constrained by the lower portion 60 of the packing retainer 56.

During valve maintenance, it may be highly desirable to access the locking pin 42 (for example, in order to replace or refinish the valve plug 34) without disassembling the actuator housing 30 or disturbing the position of the adjusting screw 51. Accordingly, the process control valve 20 may be designed with sufficient stem travel to allow the locking pin 42 to be exposed and not covered by the lower portion 60 of the packing retainer 56 when the process control valve 20 is disassembled by removing the hammer nut 54 from the valve body 22. The amount of actuator travel may be controlled by the distance between the lower diaphragm washer 45 and the cap screws 47. The hammer nut 54 has sufficient thread engagement with the valve body 22 to provide a safe, easy way to control the stem position during valve disassembly without disturbing the position of the adjusting screw 51.

By positively retaining the locking pin 42 by mechanical means, the locking pin material, stem material, and the amount of mechanical interference between the locking pin 42 and the bores 44 and 46 in the valve stem 32 and the valve plug 34, respectively, may be such that the locking pin may be easily removed with a hammer and a punch during valve maintenance procedures. For example, the locking pin material may be UNS S17400 and the stem material may be UNS S20910. Additionally, the amount of mechanical interference in the illustrated embodiment may be defined by a 5/32 inch (0.397 cm) Type E groove pin, per American Society of Mechanical Engineers (ASME) Standard B18.8.2, with corresponding bore diameters 44 and 46 each in a range of from approximately 0.158 inches (0.401 cm) to approximately 0.160 inches (0.406 cm). This condition is sometimes referred to as a "loose" pin connection, and avoids situations in which the locking pin must be drilled out for removal, as may be required if an interference fit is used in the absence of such mechanical restraint.

Since the packing retainer 56 is threaded to the bonnet 28, the packing retainer 56 will not remain stuck inside the valve body 22 when the bonnet 28 is removed. The alignment and retention of the plug 34 onto the valve stem 32 may be achieved without the need for a cage, which may be advantageous, especially in certain applications, such as, for example, where the process fluid is gritty or sticky and therefore a cage can cause the valve to become clogged or the valve plug 34 to bind.

As configured in accordance with the present disclosure, the disassembly of the process control valve 20 does not require disassembly of the packing 52. Accordingly, the level of packing stress or preload may be preserved, ensuring that packing sealing performance is consistent with pre-maintenance operation. This configuration simplifies valve maintenance for assemblies that simply have worn or damaged trim and do not require packing adjustment or packing replacement. In addition, by not having to remove the packing or the valve stem, packing damage may be avoided and therefore the need for packing replacement due to damage during valve maintenance may also be avoided. The configuration also has an advantage of avoiding the need to disassemble the actuator housing 30 during valve maintenance, thus maintaining proper spring adjustment.

The foregoing detailed description has been given for clearness of understanding only and no unnecessary limitations should be understood therefrom, as modifications will be obvious to those skilled in the art. For example, the invention is applicable to many types of valves in addition to on/off valves, throttling valves, and control valves, and is also applicable to valves that include a different type of locking member, such as a locking bolt instead of a locking pin for securing the valve stem to the valve plug.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A valve trim assembly for a process control valve having a valve body and a bonnet, the valve trim assembly comprising:
   a valve plug adapted to move to one of a plurality of operational positions with respect to the valve body, the valve plug including a plug bore;
   a movable valve stem attached to the valve plug, the movable valve stem including a stem bore therein, the stem bore adapted to substantially align with the plug bore;
   a locking member disposed in the stem bore and the plug bore; and
   a retaining member attached to the bonnet that substantially surrounds the locking member at all operational positions of the valve plug, wherein the retaining member comprises a cylindrically-shaped portion of a packing retainer.

2. The valve trim assembly of claim 1, wherein the packing retainer is threadably attached to the bonnet.

3. A valve trim assembly for a process control valve having a valve body and a bonnet, the valve trim assembly comprising:
   a valve plug adapted to move to one of a plurality of operational positions with respect to the valve body, the valve plug including a plug bore;

a movable valve stem attached to the valve plug, the movable valve stem including a stem bore therein, the stem bore adapted to substantially align with the plug bore;

a locking member disposed in the stem bore and the plug bore; and a retaining member attached to the bonnet that substantially surrounds the locking member at all operational positions of the valve plug, wherein the plug is threadably attached to the movable valve stem.

4. A process control valve, comprising:

a valve body having a fluid inlet passage, a fluid outlet passage, and an orifice disposed between the fluid inlet passage and the fluid outlet passage;

a bonnet attached to the valve body;

a valve plug adapted to move to one of a plurality of operational positions with respect to the valve body, the valve plug including a plug bore;

a movable valve stem attached to the valve plug, the movable valve stem including a stem bore therein, the stem bore adapted to substantially align with the plug bore;

a locking member disposed in the stem bore and the plug bore; and a retaining member fixedly attached to the bonnet that substantially surrounds the locking member at all operational positions of the valve plug, wherein the retaining member comprises a cylindrically-shaped portion of a packing retainer.

5. The process control valve of claim 4, wherein the packing retainer is threadably attached to the bonnet.

6. A process control valve, comprising:

a valve body having a fluid inlet passage, a fluid outlet passage, and an orifice disposed between the fluid inlet passage and the fluid outlet passage;

a bonnet attached to the valve body;

a valve plug adapted to move to one of a plurality of operational positions with respect to the valve body, the valve plug including a plug bore;

a movable valve stem attached to the valve plug, the movable valve stem including a stem bore therein, the stem bore adapted to substantially align with the plug bore;

a locking member disposed in the stem bore and the plug bore; and a retaining member fixedly attached to the bonnet that substantially surrounds the locking member at all operational positions of the valve plug, wherein the plug is threadably attached to the movable valve stem.

7. A method of securing a valve plug to a valve stem in a process control valve that includes a valve body and a bonnet, the method comprising:

providing a stem bore in the valve stem;

providing a plug bore in the valve plug;

attaching the valve plug to the valve stem;

aligning the plug bore with the stem bore;

inserting a locking member into the aligned plug bore and stem bore; and preventing the locking member from extending outside of the aligned plug bore and stem bore by attaching a retaining member to the bonnet, such that the retaining member substantially surrounds the locking member at all operational positions of the valve plug, wherein attaching the valve plug to the valve stem comprises threadably attaching the valve plug to the valve stem.

8. A method of securing a valve plug to a valve stem in a process control valve that includes a valve body and a bonnet, the method comprising:

providing a stem bore in the valve stem;

providing a plug bore in the valve plug;

attaching the valve plug to the valve stem;

aligning the plug bore with the stem bore;

inserting a locking member into the aligned plug bore and stem bore; and preventing the locking member from extending outside of the aligned plug bore and stem bore by attaching a retaining member to the bonnet, such that the retaining member substantially surrounds the locking member at all operational positions of the valve plug, wherein the retaining member comprises a cylindrically-shaped portion of a packing retainer.

9. The method of claim 8, wherein the packing retainer is threadably attached to the bonnet.

* * * * *